(12) United States Patent
Tsai (10) Patent No.: US 10,222,680 B2
(45) Date of Patent: Mar. 5, 2019

(54) WEBCAM SHUTTER

(71) Applicant: Hewlett-Packard Development Company, L.P., Houston, TX (US)

(72) Inventor: Ming-Shan Tsai, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

(21) Appl. No.: 15/544,914

(22) PCT Filed: Jan. 30, 2015

(86) PCT No.: PCT/US2015/013660
§ 371 (c)(1),
(2) Date: Jul. 20, 2017

(87) PCT Pub. No.: WO2016/122557
PCT Pub. Date: Aug. 4, 2016

(65) Prior Publication Data
US 2018/0017843 A1    Jan. 18, 2018

(51) Int. Cl.
| G03B 17/00 | (2006.01) |
| G03B 11/04 | (2006.01) |
| G06F 1/16  | (2006.01) |
| H04N 5/225 | (2006.01) |

(52) U.S. Cl.
CPC ......... *G03B 11/043* (2013.01); *G06F 1/1607* (2013.01); *H04N 5/2254* (2013.01)

(58) Field of Classification Search
USPC ....................................................... 396/448
See application file for complete search history.

(56) References Cited

U.S. PATENT DOCUMENTS

| 6,930,725 | B1  |   | 8/2005  | Hayashi |
| 7,628,554 | B2  |   | 12/2009 | Wernersson |
| 8,220,626 | B2  |   | 7/2012  | Liu |
| 8,471,956 | B2  | * | 6/2013  | Fortmann ............. G06F 1/1613 |
|           |     |   |         | 348/373 |
| 8,496,390 | B2  | * | 7/2013  | Ohuchi ................ G03B 11/043 |
|           |     |   |         | 359/511 |
| D810,180  | S   | * | 2/2018  | Gustaveson, II ............ D16/237 |
| 2005/0225668 | A1 | * | 10/2005 | Kim ..................... H04N 5/2253 |
|           |     |   |         | 348/373 |
| 2006/0147198 | A1 |   | 7/2006  | Shin et al. |
| 2006/0268505 | A1 |   | 11/2006 | Krah |
| 2007/0114433 | A1 |   | 5/2007  | Masahiko |
| 2007/0242948 | A1 | * | 10/2007 | Miramontes .......... G03B 17/00 |
|           |     |   |         | 396/448 |

(Continued)

FOREIGN PATENT DOCUMENTS

| CN | 10277573 A     | 5/2011 |
| DE | 102011107805 A1 | 1/2013 |

(Continued)

*Primary Examiner* — Rodney E Fuller
(74) *Attorney, Agent, or Firm* — Wall & Tong LLP (57) ABSTRACT

In one example, a webcam shutter assembly includes a first sub-assembly and second sub-assembly formed independently of each other. The first sub-assembly includes a shutter for selectively covering a camera lens, and the second sub-assembly includes a manually operable actuator. The actuator is biased in a non-engaging arrangement with the shutter and is positioned to releasably engage the shutter for movement of the shutter in a lateral direction.

15 Claims, 6 Drawing Sheets

(56) References Cited

U.S. PATENT DOCUMENTS

| | | | |
|---|---|---|---|
| 2007/0269202 A1* | 11/2007 | Forsyth-Martinez | ........................ G03B 11/00 396/429 |
| 2008/0317460 A1 | 12/2008 | Eromaki | |
| 2010/0102979 A1* | 4/2010 | Huang | ................... G06F 1/1616 340/686.1 |
| 2011/0058255 A1* | 3/2011 | Weiss | ................... H04M 1/0264 359/511 |
| 2013/0088639 A1 | 4/2013 | Mundt et al. | |
| 2015/0009399 A1 | 1/2015 | Jonsson et al. | |
| 2015/0163385 A1* | 6/2015 | Haddad | ................ H04N 5/2254 348/374 |
| 2018/0004068 A1* | 1/2018 | Chen | .................... G03B 11/041 |
| 2018/0059510 A1* | 3/2018 | Gustaveson, II | .... H04N 5/2254 |

FOREIGN PATENT DOCUMENTS

| | | |
|---|---|---|
| JP | 2007-133169 A | 5/2007 |
| KR | 10-2007-0074185 A | 7/2007 |
| TW | I313361 | 8/2009 |

\* cited by examiner

WEBCAM SHUTTER

BACKGROUND

Modern computing devices often include integrated still or video cameras that can feed or stream images to a communication network—popularly, such devices are referred to as "webcams." For instance, a webcam may be integrated into the bezel of a computing device's display. Some webcams include a shutter that can be selectively moved in front of the camera lens to provide privacy when the user does not wish to transmit images.

DETAILED DESCRIPTION

The present disclosure broadly discloses a webcam shutter for bezel-integrated webcams. As discussed above, some webcams include a shutter to selectively provide privacy. When the user does not wish for the webcam to transmit images, the shutter is simply moved to cover the camera lens. The shutter can be removed from the camera lens when the user wishes to resume transmitting images. Some shutters include an actuator that is fixedly integrated into the shutter; the actuator thus adds to the thickness of the bezel. Actuators that are integrated into the shutter can also cause the shutter to be operated unintentionally, e.g., by the user accidentally bumping into the shutter.

Examples of the present disclosure provide a novel webcam shutter. For instance, examples of the present disclosure provide a two-piece shutter assembly including first and second sub-assemblies that are formed independently of each other, i.e., so that each can be fixed to a different portion of a computing device. The first sub-assembly is fixed to the front bezel of the computing device and includes a shutter mounted on a roller. The second sub-assembly is fixed to the rear cover of the computing device and includes a manual actuator positioned to releasably engage the roller. The actuator and the roller are biased in a non-engaging arrangement relative to each other; however, when the actuator engages the roller, the roller and the shutter are moved in a lateral direction, i.e., along a line that intersects the optical axis of the camera, to either cover or uncover the lens. The two-piece shutter assembly simplifies installation and maintenance of the shutter, accommodates thin form factor devices, and reduces the likelihood of unintentionally covering or uncovering the lens.

Figure 1:
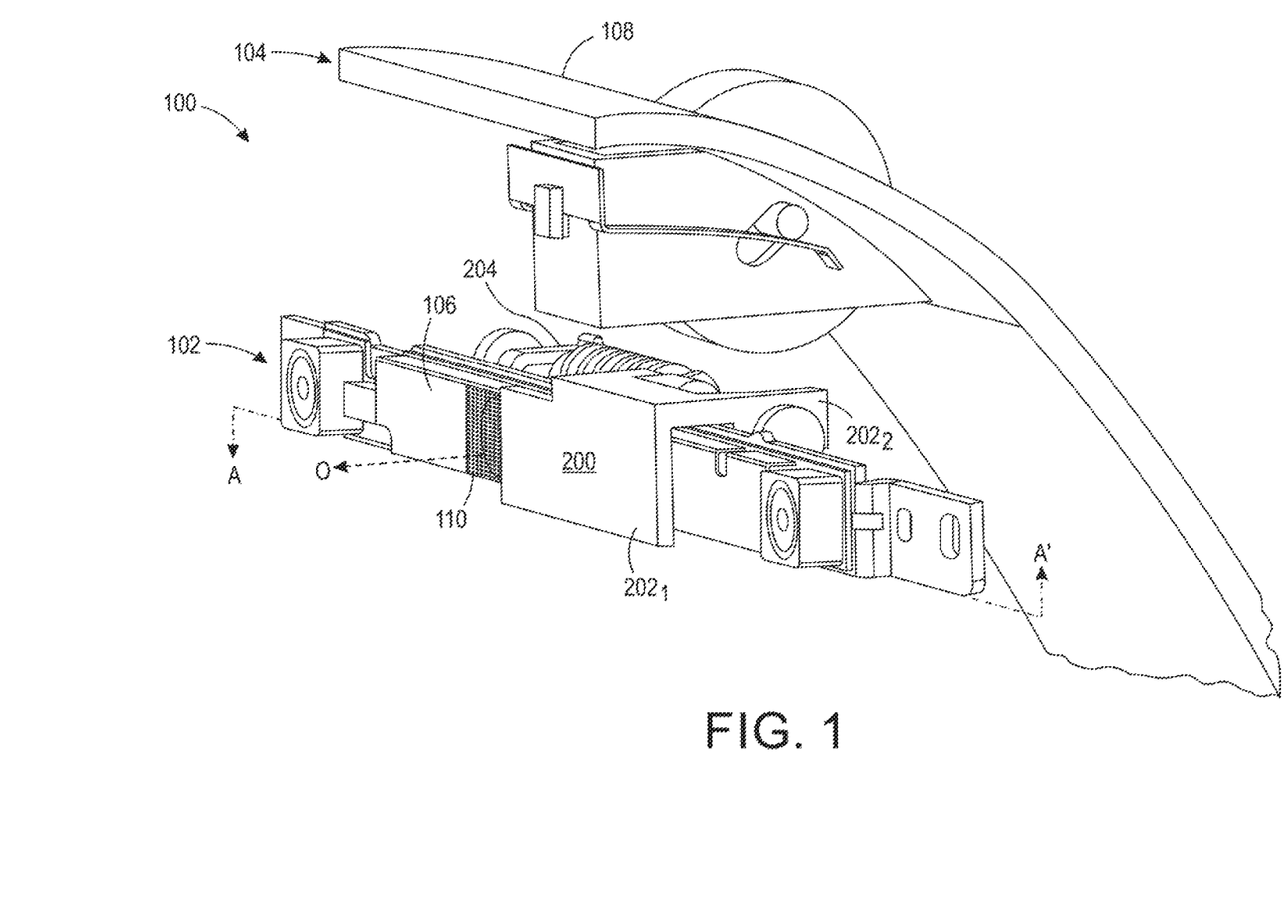
FIG. 1 illustrates an example webcam shutter assembly of the present disclosure.

FIG. 1 illustrates an example webcam shutter assembly 100 of the present disclosure. In one example, the assembly 100 includes a first sub-assembly 102 and a second sub-assembly 104. The first sub-assembly 102 is fixed to the front bezel of a computing device in which the webcam is integrated, while the second sub-assembly 104 is fixed to the rear cover of the computing device. A portion 106 of the front bezel and a portion 108 of the rear cover are illustrated to show how the first sub-assembly 102 and the second sub-assembly 104 may be incorporated into the computing device; however, the computing device is not illustrated in its entirety. A portion of the webcam's lens 110 is also visible in FIG. 1.

Figure 2:
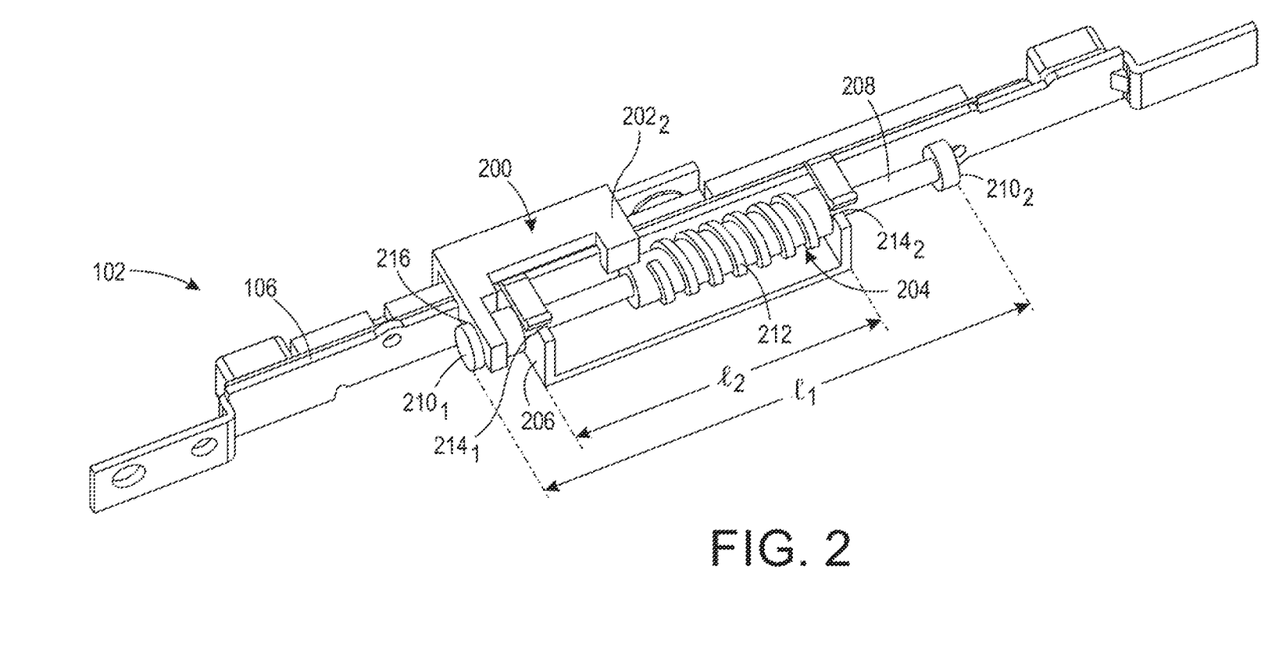
FIG. 2 illustrates the example first sub-assembly of FIG. 1 in greater detail.

FIG. 2 illustrates the first sub-assembly 102 of FIG. 1 in greater detail. In particular, FIG. 2 illustrates the portions of the first sub-assembly 102 that are hidden from view or are not visible in their entireties in FIG. 1. As discussed above, the first sub-assembly 102 is fixed to the front bezel of a computing device in which the webcam is installed. The first sub-assembly 102 generally comprises a shutter 200 mounted on a roller 204.

Referring simultaneously to FIG. 1 and FIG. 2, the shutter 200 comprises a door formed from an opaque or semi-opaque material. The shutter 200 is movable in a lateral direction, i.e., along a line A-A' that intersects the optical axis O of the camera, to selectively cover or uncover the lens 110. The shutter 200 has a substantially L-shaped cross section. A first leg $202_1$ of the shutter 200 is positioned to overlap the front bezel. A second leg $202_2$ of the shutter 200 meets the first leg $202_1$ at a substantially right angle, e.g., ninety degrees, within some tolerance; thus, the second leg $202_2$ of the shutter 200 is positioned to rest over the edge of the front bezel. The second leg $202_2$ of the shutter 200 also includes an aperture 216 that allows the shutter 200 to be mounted to the roller 204.

The roller 204 comprises a substantially cylindrical body 208. At each end of the body 208 is a travel stop $210_1$ or $210_2$, hereinafter collectively referred to as "travel stops 210." The roller 204 also includes a threaded middle portion 212 located between the two travel stops 210.

The roller 204 sits within a roller bracket 206. The roller bracket 206 serves as a support for the roller 204, and also as a limiter to control the roller's range of lateral motion. The length $l_1$ of the roller 204 is greater than the length $l_2$ of the roller bracket 206.

The roller bracket 206 includes a first aperture $214_1$ formed in a first end of the roller bracket's frame and a second aperture $214_2$ formed in a second end of the roller bracket's frame. The roller 204 is seated within the roller bracket 206 such that the threaded middle portion 212 of the roller 204 is positioned between the first aperture $214_1$ and the second aperture $214_2$; the travel stops 210 of the roller 204 protrude beyond the ends of the roller bracket's frame. In this position, the roller 204 may rotate within the roller bracket 206.

Figure 3A:
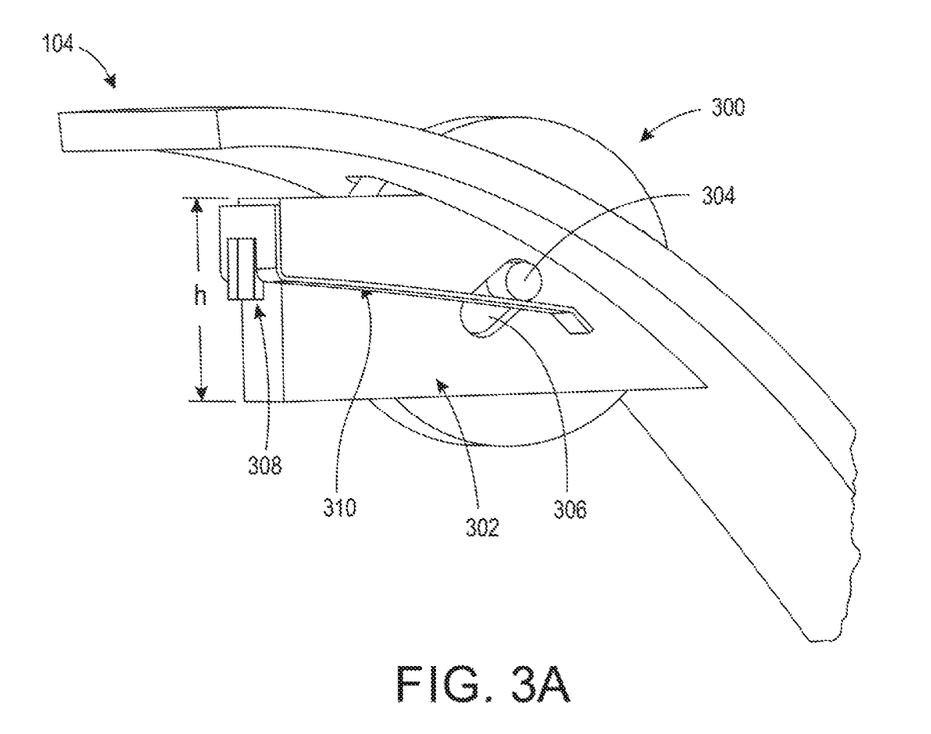
FIGS. 3A-3C illustrate the example second sub-assembly of FIG. 1 in greater detail.
Figure 3B:
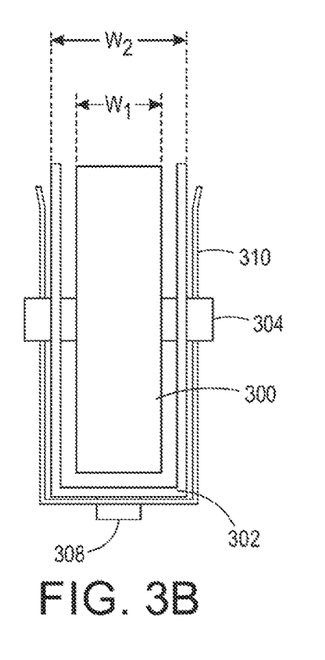
Figure 3C:
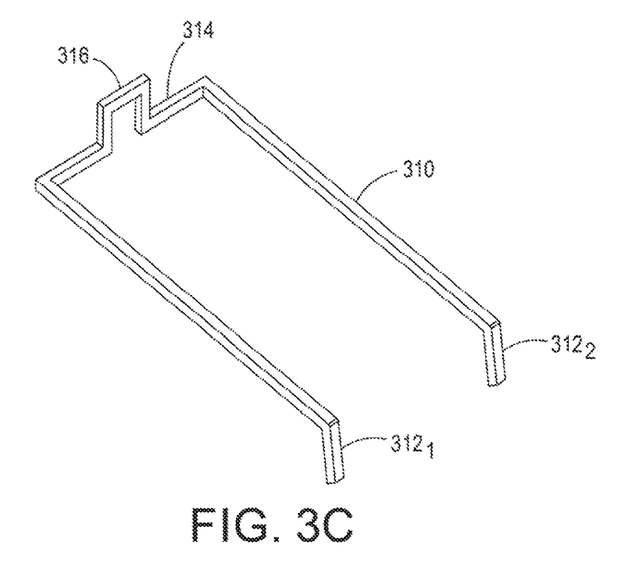

FIGS. 3A-3C illustrate the second sub-assembly 104 of FIG. 1 in greater detail. In particular, FIG. 3A illustrates an isometric view of the second sub-assembly 104; FIG. 3B illustrates a top view of a portion of the second sub-assembly 104; and FIG. 3C illustrates an isometric view of a portion of the second-sub-assembly 104. As discussed above, the second sub-assembly 104 is fixed to the rear cover of a computing device in which the webcam is installed. The second sub-assembly 104 generally comprises a shutter wheel 300 mounted within a wheel housing 302.

The shutter wheel 300 includes a short axle 304 disposed through the center of the shutter wheel 300, such that one end of the axle 304 protrudes from each side of the shutter wheel 300.

The wheel housing 302 is fixed to an interior surface of the computing device's rear cover and defines a hollow volume within which the shutter wheel 300 sits. The width w1 of the shutter wheel 300 (not including the axle 304) is smaller than the interior width w2 of this hollow volume. A height h of the wheel housing 302 is smaller than the diameter of the shutter wheel 300, such that when the shutter wheel 300 is seated within the wheel housing 302, a portion of the shutter wheel 300 protrudes beyond the boundaries of the wheel housing 302.

Each side of the wheel housing 302 includes an elongated slot 306 for receiving a portion of the shutter wheel's axle 304 when the shutter wheel 300 is seated in the wheel housing 302. In addition, an exterior surface of the wheel housing 302 includes a flange 308 for supporting a spring 310. As illustrated, the spring 310 is substantially U-shaped, having two tines $312_1$ and $312_2$, hereinafter collectively referred to as "tines 312," that extend from a base 314. The base 314 additionally includes a notch 316. When the notch 316 of the spring 310 is seated on the flange 308 of the wheel housing 302, the tines 312 of the spring 310 extend along the sides of the wheel housing 302, at roughly the height of the elongated slot 306. As illustrated in FIG. 3A, the tines 312 of the spring 310 are positioned below the axle 304 of the shutter wheel 300; this arrangement biases the shutter wheel 300 in an upward position.

Figure 4:
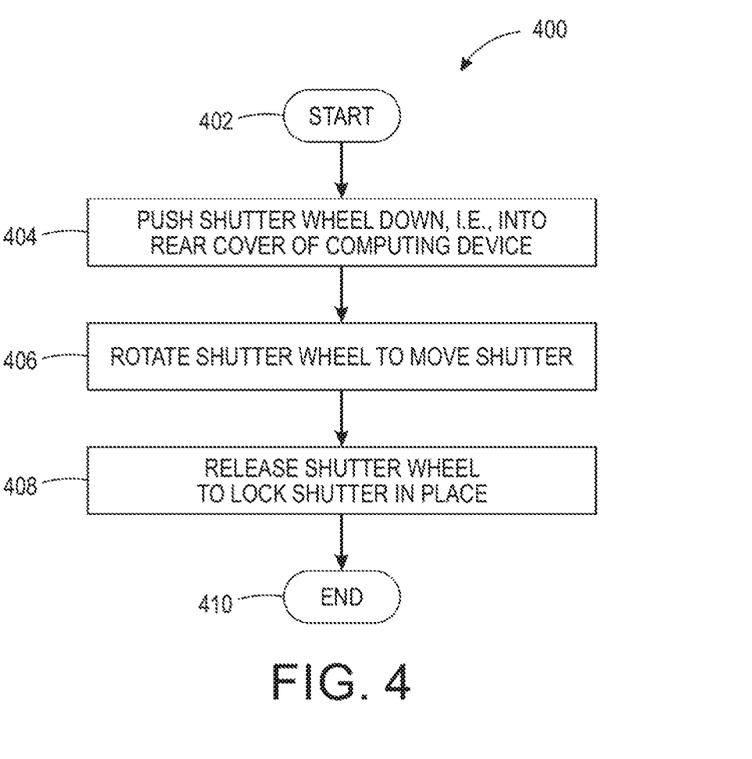
FIG. 4 illustrates a flowchart of an exemplary method for operating the webcam shutter illustrated in FIG. 1.

FIG. 4 illustrates a flowchart of an exemplary method 400 for operating the webcam shutter illustrated in FIG. 1. As discussed above, the webcam shutter assembly 100 is manually operable by a user.

At block 402, the method 400 begins. At block 404, the user pushes the shutter wheel 300 down, i.e., in a direction into the rear cover of the computing device. The downward pressure is sufficient to overcome the bias of the spring 310, and the axle 304 of the shutter wheel 300 is allowed to slide downward in the elongated slot 306 of the wheel housing 302. As a result, the shutter wheel 300 engages the threaded middle portion 212 of the roller 204.

Figure 5:
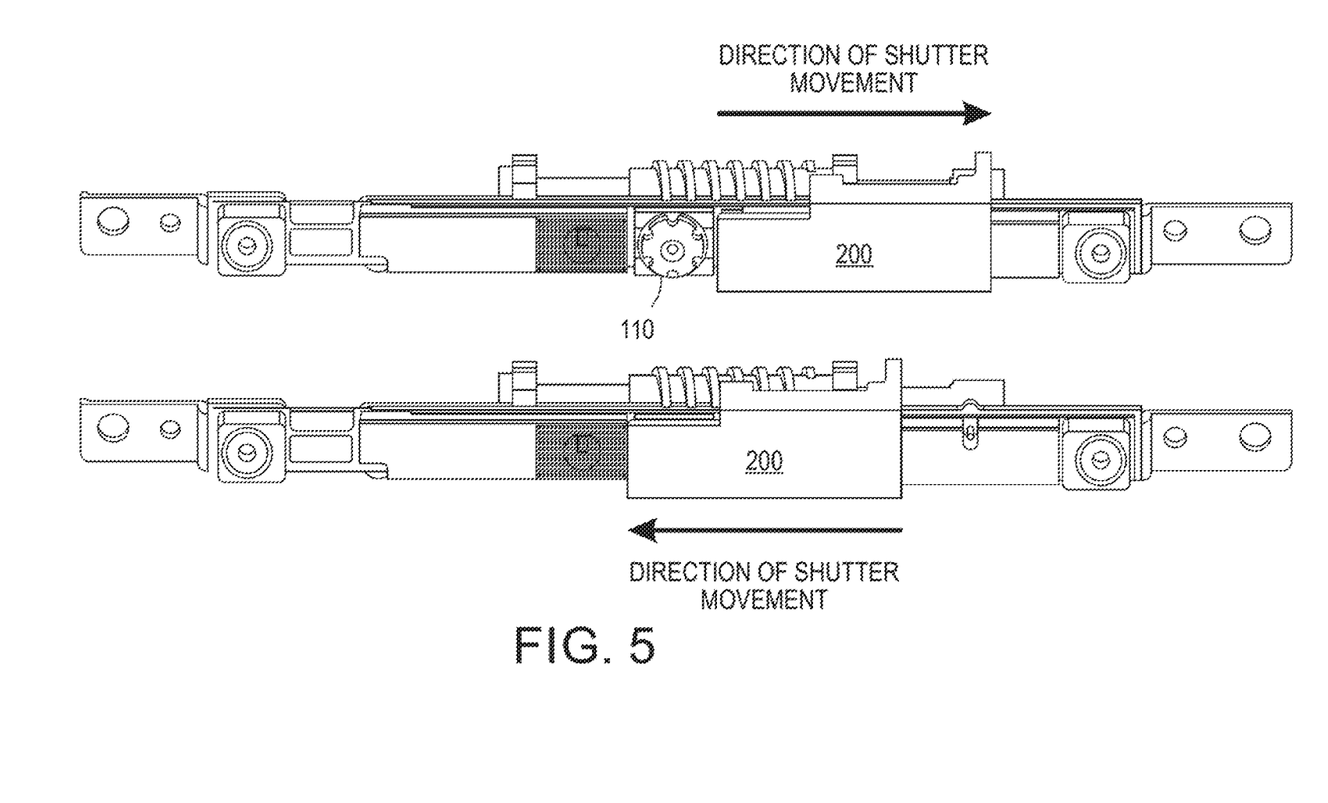
FIG. 5 illustrates the example webcam shutter in the "open" and "closed" positions.

At block 406, the user rotates the shutter wheel 300. As the shutter wheel 300 rotates, it engages the threads of the roller's threaded middle portion 212, causing the roller 204 to rotate. As the roller 204 rotates, the roller 204 moves laterally within the roller bracket 206, i.e., along an axis of travel that intersects a line along which the downward pressure is applied and also intersects the optical axis of the webcam. The shutter 200, which is mounted to the roller 204, also moves laterally. The direction in which the shutter wheel 300 is rotated will control the lateral direction within which the roller 204 moves. Depending on which lateral direction the roller 204 moves, the shutter 200 will move to either cover or uncover the lens 110, as illustrated in FIG. 5, which illustrates the webcam shutter 200 in the "open" and "closed" positions. Lateral movement of the shutter 200 is limited by the travel stops 210 on the roller 204, which prevent the shutter 200 from moving too far in either direction; when the roller 204 is rotated far enough for one of the travel stops 210 to meet the frame of the roller bracket 206, the roller 204 can travel no further in that direction.

At block 408, the user releases the shutter wheel 300, once the webcam shutter 200 has been moved to the desired location. Without the downward pressure, the spring 310 moves back into its resting position. Movement of the spring 310 biases the shutter wheel 300 upward, i.e., away from the roller 204, such that the shutter wheel 300 releases or is disengaged from the threaded middle portion 212 of the roller 204. The webcam shutter 200 is now "locked" or fixed in position until or unless the user repeats blocks 404-406.

The method 400 ends in block 410.

Thus, the shutter wheel 300 operates as an actuator for the webcam shutter assembly 100. In particular, under manual actuation, the shutter wheel 300 releasably engages the roller 204 and causes the roller 204 to rotate. Rotation of the roller 204 moves the shutter 200 in a lateral direction, to either cover or uncover the lens of the webcam. Manual actuation requires the exertion of both downward pressure on the shutter wheel 300 (to engage the roller 204) and rotation of the shutter wheel 300 (to cause movement of the roller); thus, it is very difficult to cause unintentional actuation of the webcam shutter assembly 100. Moreover, because the actuator is fixed to the rear cover of the computing device, the bezel does not have to be enlarged to support the webcam shutter assembly 100, and the computing device can maintain an overall form factor that is thin and compact. In addition, because the actuator is incorporated into the rear cover of the computing device, the actuator can be easily accessed for installation and maintenance without requiring the bezel to be removed.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus, comprising:
    a first sub-assembly comprising a shutter for selectively covering a camera lens; and
    a second sub-assembly, formed independently of the first sub-assembly and comprising a manually operable actuator positioned to releasably engage the shutter for movement of the shutter in a lateral direction,
    wherein the actuator is biased in a non-engaging arrangement with the shutter.

2. The apparatus of claim wherein the shutter is mounted on a roller.

3. The apparatus of claim 2, wherein the roller comprises:
    a cylindrical body having a first end and a second end; and
    a threaded portion positioned between the first end and the second end.

4. The apparatus of claim 3, wherein the roller further comprises:
    a first travel stop positioned at the first end of the cylindrical body; and
    a second travel stop positioned at the second end of the cylindrical body.

5. The apparatus of claim 4, wherein the first travel stop and the second travel stop are positioned to limit a distance in the lateral direction that the shutter travels.

6. The apparatus of claim 3, wherein the actuator comprises a wheel.

7. The apparatus of claim 6, wherein the wheel is biased in the non-engaging arrangement with the shutter by a spring that applies a biasing force to an axle of the wheel.

8. The apparatus of claim 6, wherein the wheel is positioned to releasably engage the threaded portion of the roller when a pressure sufficient to overcome the biasing force is applied to the wheel.

9. The apparatus of claim 8, wherein the pressure is applied along a line that intersects an axis of travel of the shutter.

10. The apparatus of claim 8, wherein engagement of the wheel and the threaded portion of the roller causes the roller to move in the lateral direction when the wheel is rotated.

11. The apparatus of claim 1, wherein the shutter is fixed in position when the actuator and the shutter are disengaged.

12. An apparatus, comprising:
    a computing device having a front bezel and a rear cover;
    a camera integrated into the front bezel;

a first sub-assembly fixed to the front bezel, wherein the first sub-assembly includes a camera shutter; and a second sub-assembly fixed to the rear cover, wherein the second sub-assembly includes a manually operable actuator positioned to releasably engage the camera shutter for movement along a line that intersects an optical axis of the camera.

13. The apparatus of claim 12, wherein the actuator is biased in a non-engaging arrangement with the camera shutter.

14. An apparatus, comprising:

a shutter mounted on a roller and positioned to selectively cover or uncover a lens of a camera when moved in a lateral direction; and a wheel positioned to engage the roller for movement of the shutter in the lateral direction, wherein the wheel is biased in a non-engaging arrangement with the roger.

15. The apparatus of claim 14, wherein the roller remains in a fixed position when not engaged by the wheel.

* * * * *

UNITED STATES PATENT AND TRADEMARK OFFICE
CERTIFICATE OF CORRECTION

PATENT NO. : 10,222,680 B2
APPLICATION NO. : 15/544914
DATED : March 5, 2019
INVENTOR(S) : Ming-Shan Tsai Page 1 of 1

It is certified that error appears in the above-identified patent and that said Letters Patent is hereby corrected as shown below:

In the Claims

In Column 4, Line 33, Claim 2, delete "claim" and insert -- claim 1, --, therefor.

In Column 5, Line 17, Claim 14, delete "roger." and insert -- roller. --, therefor.

Signed and Sealed this
Second Day of July, 2019

Andrei Iancu
*Director of the United States Patent and Trademark Office*